Inventors
ANDRES BRUYERE &
JUAN ANDRES ROBERTO BRUYERE

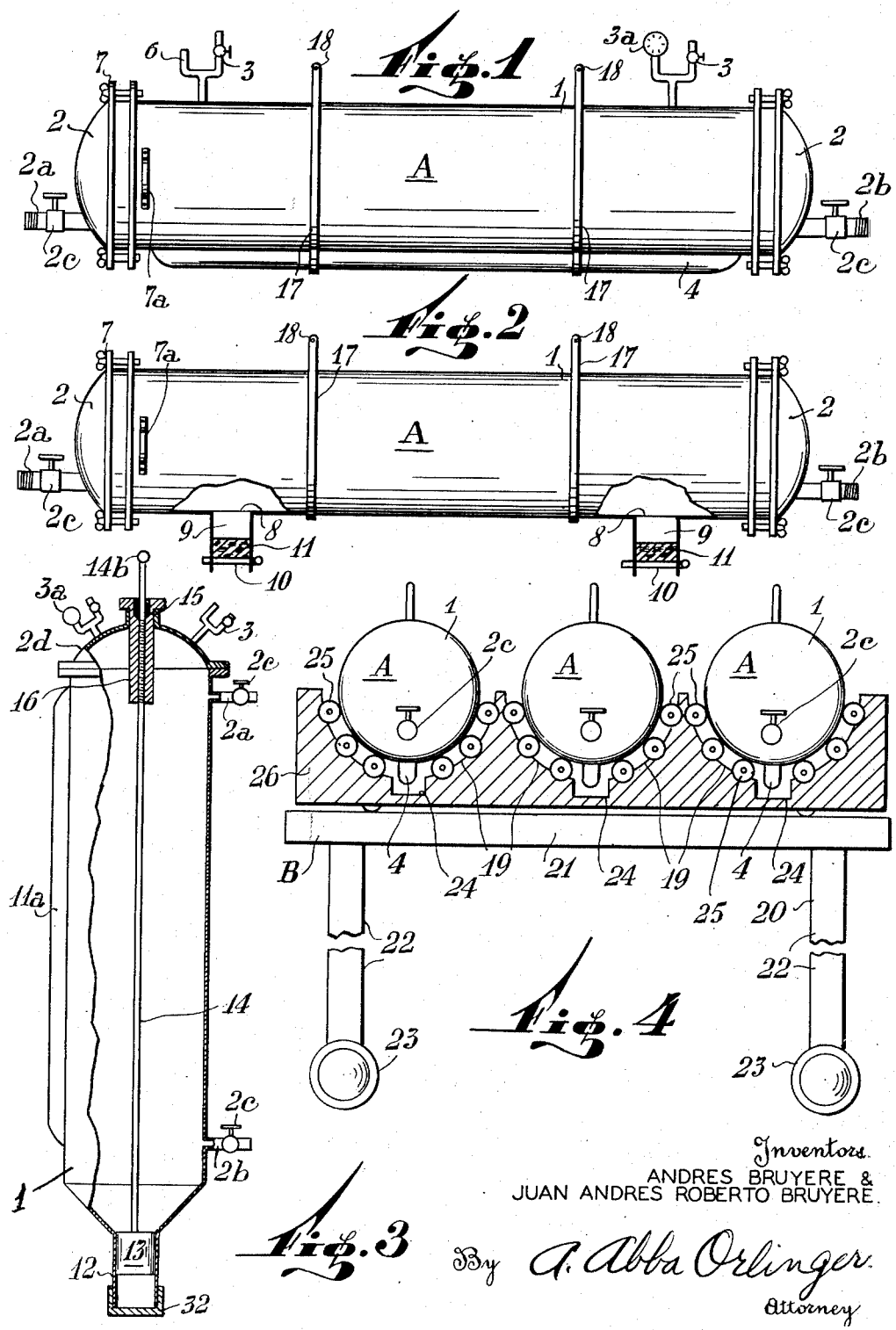

By A. Abba Orlinger
Attorney

UNITED STATES PATENT OFFICE 2,610,123

DEVICE AND PROCESS FOR PRODUCING CHAMPAGNE, SPARKLING WINES, AND OTHER FERMENTED BEVERAGES

Andres Bruyère and Juan Andres Roberto Bruyère, Vincente Lopez, Argentina

Application November 27, 1950, Serial No. 197,662

12 Claims. (Cl. 99—48)

The present invention refers to the production of champagne, sparkling wines and other similar beverages. More particularly, it refers to a new device for elaborating champagne, sparkling wines and other similar beverages, and to the processes carried out with the aid of said device.

Sparkling wines and similar beverages are generally produced by methods which may be divided into two principal groups. The classical method is carried out by bottling wine before the fermentation has been completed and allowing the wine to finish fermentation, or to undergo a second fermentation, in the bottle. By this method champagne or a similar beverage of highest quality is produced but the method is extremely troublesome and highly expensive. During fermentation in the bottle the grape sugar, or sugar added to the wine, is converted into alcohol and carbon dioxide, and the presence of the latter causes a relatively high pressure, for instance, up to 12 atmospheres or more to be built up within the hermetically closed bottle. The danger of explosion constitutes a very serious problem in handling these bottles during the fermentation process, and in spite of all precautions that may be taken, accidents cannot be avoided. These not only result in a loss of the product and the bottle, but also affect the workmen employed in handling the bottles during fermentation.

On the other hand, apart from alcohol and carbon dioxide, sediments are produced during fermentation in the bottle, and these must be removed before the champagne or other beverage may be sold and consumed. The removal of the sediments constitutes another problem. In view of this problem the bottles have to be periodically shaken in order to prevent the sediments from adhering to the inner walls of the bottle. During the shaking the danger of explosions is particularly great and skilled labor has to be employed in order that the operation be properly executed. In order to remove the sediments from the bottle they are first collected upon the inside face of the cork of the bottle, whereafter the liquid in the neck of the bottle is frozen into solid state and finally the cork and the small block of ice containing the sediments are blown off with the aid of the gas pressure within the bottle. In order to avoid loss of liquid, immediately after removal of the sediments, the bottle must be hermetically closed again. In this step, as in the previous ones great skill is required and, apart from the accidents which are liable to happen, losses of valuable liquid cannot be avoided in the period between the uncorking and the new sealing of the bottles.

In order to overcome these and many other difficulties connected with the method of fermenting in bottles, many manufacturers of sparkling wines and similar beverages are now employing methods of the second group or type mentioned above. According to this type of process, the wine concludes fermentation or undergoes a second fermentation not in bottles but in large sealed vats or containers. Whilst this method provides a cheaper and similar procedure, the final product is of relatively inferior quality and in many countries laws have been enacted which prohibit the sale of these products under the name of "champagne," thus reserving this name only and exclusively for the high quality wines produced by the classical process in bottles.

The main purpose of the present invention is to provide a device and process for elaborating true champagne and other sparkling wines and similar beverages by means of a method in which the general principles of the above-mentioned bottle process are employed but many of the disadvantages of said process are avoided and the process is rendered simpler and more economical.

Furthermore, it is known that the ageing can be shortened if during the later stages of fermentation or during the second fermentation the wine is subjected to sudden changes of temperature. Also, if in the final stage of the process the liquid is cooled down to a few degrees below 0° C., the tartrates are caused to precipitate in the form of relatively big crystals and such low temperature treatment also facilitates the clarification of the liquid. Whilst the advantages of applying to the liquid sudden changes of temperatures and the final low temperature, have been known, it has not been possible to employ these treatments economically in the production of champagne in the bottle because in practice it would be most difficult to carry a great number of bottles from a low-temperature chamber into a high-temperature chamber, and vice versa, in order to achieve the desired sudden changes in the ambient temperature. This is also impossible in vats.

It is therefore another purpose of the present invention to provide a device and process for the production of champagne, sparkling wines and other similar beverages which enables the liquid to be subjected to the desired sudden changes in temperature and to the above-mentioned final low temperature treatment.

A further object of the invention is to provide a device and process in which it is unnecessary to filter the liquid which is a considerable advantage over the processes carried out in large vats or similar containers.

Further purposes of the invention will become evident from the following detailed description of several preferred embodiments of the invention in which description reference will be made to the accompanying drawings, in which Fig. 1 is a perspective view of a container which forms part of the device according to the present invention;

Fig. 2 is a similar view of another embodiment of said container;

Fig. 3 is a longitudinal section through a further embodiment of said container;

Fig. 4 is a cross-sectional view of the complete device showing several containers resting on a movable support;

Figure 6:
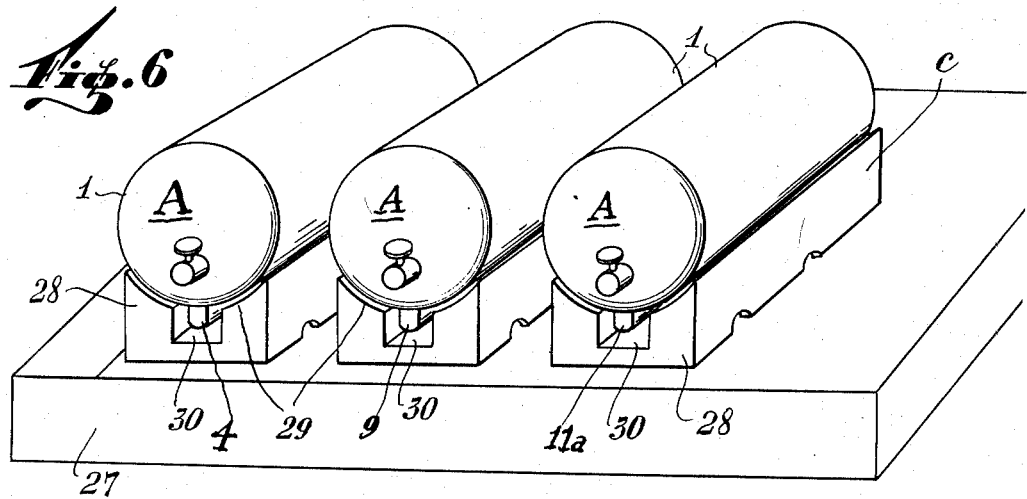
Fig. 6 is a perspective view of an auxiliary device with the aid of which the sediments may be separated from the liquid contained in the containers shown.

It will be understood that the drawings are somewhat schematical and, whilst they illustrate preferred embodiments of the invention, the latter is not limited to the details shown. Throughout the several figures of the drawings the same reference numerals and characters have been employed in order to designate equal or corresponding parts.

Referring now to Fig. 1 of the drawings, the same shows a container A within which the wine or similar liquid, for instance fruit juice and the like, is kept during fermentation or during the later stages of fermentation, or during the second fermentation. Said container comprises a cylindrical hollow body 1 made of any suitable material which can resist the relatively high pressure built up within the container during fermentation. Stainless steel, plastic materials, strong glass, eventually reinforced by an outer coating or mesh, may be used for this purpose.

The end walls 2 of the container are outwardly curved and inlet tube 2a and outlet tube 2b pass, respectively through the two end walls 1. In each of these tubes a valve 2c is inserted which enables a controlled amount of liquid to flow through the tubes into or, respectively, out of the container. These valves are also adapted to be hermetically closed during the fermentation process.

On the top of the container or cylindrical body 1 there are inlet and outlet valves 3, and a pressure gauge 3a. The valves are adapted, respectively, to permit the introduction into and the removal from the container of controlled amounts of carbon dioxide and other gases or air. Preferably at least one of the conduits associated with these valves comprises a safety valve 6 through which gases may escape when the pressure within container A exceeds a predetermined limit, e. g., 15 atmospheres or less.

The bottom of container 1 is provided with a longitudinal extension 4 adapted to receive the sediments produced during the fermentation. This extension is channel-shaped and preferably extends from substantially one of the curved end plates 2 to the other.

If desired, several clamping devices 7 may be employed in order to removably secure at least one end plate 2 to container 1. At least one of these clamps adjacent end plate 1 is formed with a handle for a purpose which will be explained herein below. Alternatively, as shown in Figs. 1 and 2, separate handles 7a may be provided on or near at least one end plate 1.

Fig. 2 shows a substantially similar container A which differs from that of Fig. 1 in that the longitudinal groove 4 is replaced by one or more tubular extensions 9, the longitudinal axis of which are perpendicular to the longitudinal axis of body 1. The inner end 8 of these tubular extensions is in free communication with the inner space of container 1. The outer end of each tubular extension is provided with a stopper 11 held in closing position by means of a lid 10.

If desired, the body may be provided with one single tubular extension 9, located preferably in the central portion of the bottom of cylindrical body 1. In this case, the bottom may be slightly inclined downwardly towards said central portion. In the embodiment shown in Fig. 2 two tubular extensions 9 are provided and in this case the bottom of container A slopes downwardly from the central region, and also from the end plates 1, towards said extensions.

In Fig. 3 a further embodiment of container A is shown. This container A is adapted to be used, in at least one phase of the process which will be described hereinafter, in a vertical position as shown. The container is provided with a top plate 2d on which valves 3 and gauge 3a similar to those of Fig. 1 are mounted. A lateral rib 11a is provided and a pair of handles 7a (not shown) are arranged one on one side and the other on the opposite side of rib 11a at substantially the same level. The bottom of container 1 tapers down to form a tubular extension 12 housing a piston 13. The upper end of piston 13 is secured to a piston rod 14 which passes through the whole length of the container 1 and through a stuffing box 15 provided at the center of top plate 2d thereof. To the inner face of said top plate a tubular guide 16 is fixed which guides piston rod 14 for sliding upward and downward movement. Outside the top plate 2d said piston 14 is provided with an operating knob or the like 14b.

Figure 5:
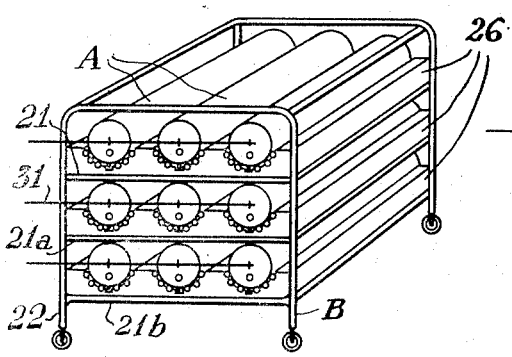
Fig. 5 is a perspective front view of another embodiment of the complete device according to the present invention.

As shown in Figs. 1 and 2, at two longitudinally spaced points the container A is provided with U-shaped members 17, passing around the lower portion of container A, and secured thereto in any suitable manner. The upper ends of each U-shaped member 17 are provided with openings 18, through which a cable (not shown) may be passed in order to lift the container with the aid of a crane, winch, or the like, Figs. 4 and 5 show movable supports generally designated with B which are designed to support a plurality of containers A during the fermentation process or a substantial portion thereof. The support B shown in Fig. 4 is adapted to carry one single horizontal row of containers A and comprises a frame 20 including four or more legs 22 having at their lower end wheels, rollers or the like, 23. The upper portion of frame 20 is constituted by a top plate 21. On top of plate 21 a supporting structure 26 is mounted which comprises a plurality of cradle-like seats or troughs 19 of substantially semi-cylindrical shape, which extend over the full length of supporting structure 26. At its lowermost portion each trough comprises a longitudinal channel 24 adapted to receive extensions 4, 9 or 11a, respectively of containers A. Each trough 19 further comprises anti-friction elements such as for instance rollers 25 extending over a substantial part of the upper surface of the trough. Containers A are placed on these rollers 25 so that they loosely rest thereon and may be rocked within said seats.

In Fig. 5 a substantially similar support B is shown which comprises several partitions 21a, 21b, arranged below top plate 21 and parallel thereto. Each of these partitions 21a, 21b, is adapted to carry a supporting structure 26 comprising a number of troughs as described with reference to Fig. 4.

Referring now to Fig. 6, this shows an auxiliary device C on which containers A may be placed in order to separate sediments from the liquid contained therein.

This device comprises a shallow container 27 for a refrigerating solution which may be cooled down to a low temperature, for instance about —18° C., without being frozen into solid state. This solution may be a solution of calcium chloride or glycerine, or any other solution used in the above-mentioned bottle method for freezing the liquid contained in the neck of the bottle.

On the upper surface of container 27 a number of supports 28 are mounted. These comprise a curved supporting surface 29 and a channel 30 for receiving extensions 4, 9, 11a respectively of containers A.

Considering now the operation of the devices shown in Figures 1 to 5, containers A are filled with liquid such as wine, partially fermented wine, fruit juices, or the like, and placed on a support B. Each container may contain approximately 100 liters of liquid and preferably the length of each container may be 1.50 meters whilst the diameter may be 0.30 meter. It will be understood, however, that containers of any other size may be employed and the invention is not limited to any determined measure.

Periodically the containers have to be shaken in order to prevent the sediments from accumulating on and adhering to the walls thereof. For this purpose, the containers may be rocked within troughs 19 by means of handles 7 or 7a.

This rocking movement is facilitated by rollers or other antifriction devices 25.

During the rocking movement, longitudinal extensions 4, 9 or 11a will knock against the lateral walls of channels 24 and this will contribute to the desired effect of causing the sediments to separate themselves from the walls and deposit within the groove 4, or tubular extensions 9.

If the embodiment shown in Fig. 3 is used, container A will also be placed in a horizontal position on support B. In this case the longitudinal extension 11a will knock against the lateral walls of groove 24 but, since rib 11a is compact, the sediments will simply accumulate in the bottom portion of cylinder 1.

If desired, several containers A, or all containers A of one horizontal or vertical row on support B may be linked together by means of a connecting rod 31, and all connecting rods may be interconnected so that by reciprocal movement of one single rod all the containers directly or indirectly connected thereto may be rocked simultaneously. If desired, rod 31 may be reciprocated by means of a suitable source of power (not shown) connected to the free end thereof.

If the next phase of the process, after fermentation has been concluded, the sediments may be removed from the containers. If the embodiment of Fig. 2 is employed, lid 10 is opened whereupon the stopper 11 and the sediments resting on the inner surface thereof will be blown off due to the pressure inside the cylinder 1. Immediately after this, lid 10 will be closed again. Only a small amount of liquid will be lost during this operation. Lid 10 preferently comprises a horizontal closing member which may slide from a closing position to an open position and vice versa. In this event the pressure within the container will not have any influence on the quick opening and closing operation.

If the embodiment of Fig. 3 is used, the sediments may be removed by means of piston 13. In the first place, container A is placed into the vertical position shown and supported therein by suitable means (not shown). Piston rod 14 is then moved downwardly to introduce piston 13 into tubular extension 12 and secured against further movement by suitable means. For this purpose, the upper portion of rod 14 may have an external screw thread engaging with internal screw threads of guiding member 16. Cap 32 is then removed from the end of tubular extension 12 and piston 13 is pushed with the aid of piston rod 14 up to the lower end of tubular extension 12 so that the piston will now close the same. The sediments below piston 13 are thereby removed from container A. Finally, if desired, cap 32 may again be screwed to the lower end of extension 12.

It will be evident that in the embodiment of Fig. 2 a piston arrangement similar to that of Fig. 3 may be used in conjunction with every tubular extension 9, and also, instead of the piston arrangement in Fig. 3 a closure similar to that of Fig. 2 may be used in conjunction with tubular extension 12 of Fig. 3.

If a container as shown in Fig. 1 is used, the sediments deposit in groove 4 and may be separated from the liquid as follows. Containers A are removed from support B with the aid of cranes or other suitable lifting elements and transferred to a support C. The solution container within container 27 will freeze the liquid contained within groove 4 and the block of ice thus formed will safely retain the sediments. The liquid may now be removed free of sediments from container A. The same method may be applied to the embodiments of Figs. 2 and 3.

Figure 7:
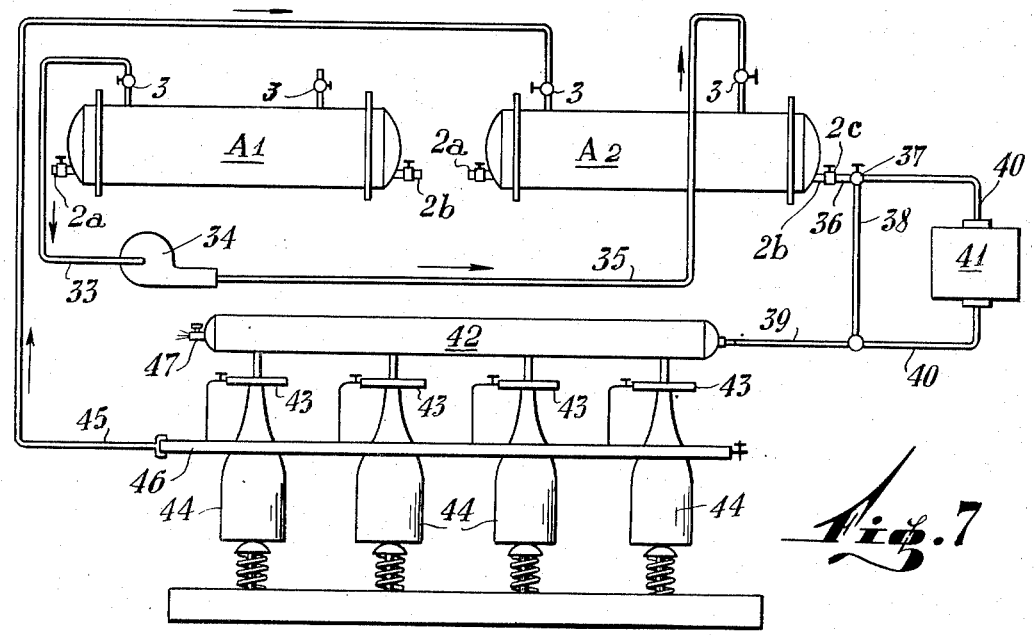
Fig. 7 is a diagrammatical view of the equipment for bottling the final product.

In Fig. 7 we have illustrated a suitable arrangement for removing the liquid from container A. According to this diagrammatical illustration, one container A1 has already been emptied. One of the valves 3 thereof is connected through a flexible pipe 33 with the suction end of a pump 34 the pressure outlet of which is connected through flexible pipe 35 to inlet valve 3 of container A2 from which the liquid contained therein is desired to be removed and bottled. The gas still contained in container A1, and which is mainly carbon dioxide produced by the fermentation of liquid in container A1, is led under suitable pressure into container A2. The pressure thus generated in container A2 compels the liquid contained therein to leave through outlet 2b the valve of which has been opened. The liquid is led through pipe 36 to a three-way valve 37 from which the liquid may pass either through pipe 38 or through pipe 40 to pipe 39. In pipe 40 a filter 41 is inserted and the liquid may thus be led to pipe 39 without previous filtering or after it has been filtered.

Pipe 39 is connected to a header 42 from which the liquid passes to a plurality of bottling heads 43 and from these to bottles 44. In order to have in the bottling heads 43 the same pressure as in container A2, outlet valve 3 thereof is connected through pipe 45 with a header 46 communicated wth said bottling heads. The carbon dioxide enters the bottles through heads 43 and the air displaced from the bottles by said gas and the liquid leaves the system through header 42 and outlet 47.

The following example will further illustrate the process.

About 80 liters of wine are fitted into each container A together with the usual amount of sugar and selected ferments. The containers are kept on one or more support B during fermentation. If desired, the supports B together with the containers A may be moved to preheated chambers kept at a temperature of about 20 to 25° C. so as to accelerate the fermentation, especially in winter, and so as to have a uniform temperature during the fermenting process.

In order to further activate fermentation, the containers may be vigorously rocked every 3 or 4 days whereby the ferments that may have settled are again suspended.

After about 30 days the fermentation is concluded. The containers may then be subjected to sudden changes of temperature during a period of 15 to 20 days by moving supports B together with containers A repeatedly from a heated chamber to a chamber kept at low temperature and vice-versa. This treatment is employed in order to age the product. Finally the containers A on supports B may be subjected to a low temperature in order to precipitate the tartrates and facilitate clarification.

After this, the product, may be bottled or may be preserved within container A during any desired period of time.

It will be evident that many changes may be introduced in the devices and processes described without departing from the basic idea of the invention and all such changes which will be easily understood by those familiar with the art are intended to be comprised within the scope of the annexed claims.

What we claim is:

1. A device for the second fermentation of fermentable liquids such as champagne, sparkling wines and other fermented beverages, which comprises a plurality of closed containers each provided with an outwardly curved bottom surface having at least one downwardly directed projection thereon, and with means for rocking the container on its longitudinal axis, at least one conduit for fluid leading from the outside of each container to its interior and a valve on each such conduit, to enable a controlled amount of liquid or gases to flow into or from said container; and a movable support for said containers which comprises a plurality of curved seats upon which the curved bottom surfaces of said containers rest, each seat comprising anti-friction means interposed between said curved seat and said curved surface and stopping surfaces cooperating with said projections for limiting the rocking movement of said containers in said seats in either direction.

2. A device according to claim 1, wherein said containers are hollow tubular, cylindrical bodies and said seats are semi-cylindrical troughs in which the containers rest in horizontal position.

3. A device for the second fermentation of fermentable liquids such as champagne, sparkling wines and other fermented beverages, which comprises a plurality of closed containers each provided with an outwardly curved bottom surface having at least one downwardly directed projection adapted to receive within its inner space sediments produced during fermentation, and with means for rocking the container on its longitudinal axis, at least one conduit for fluid leading from the outside of each container to its interior and a valve on each such conduit, to enable a controlled amount of liquid or gases to flow into or from said container, and a movable support for said containers, which comprises a plurality of curved seats upon which the curved bottom surfaces of said containers rest, each seat comprising antifriction means interposed between said curved seat and said curved surface and stopping surfaces, cooperating with said projections for limiting the rocking movement of said containers in said seats in either direction.

4. A device according to claim 3, wherein said downwardly directed projection is a channel extending from one end to the other end of the container.

5. A device according to claim 3, wherein each of the at least one projection is a tubular extension the longitudinal axis of which is perpendicular to the longitudinal axis of the container, and which opens into the interior of the container, the bottom of the latter preferably being inclined towards the region where each said projection is located.

6. A device according to claim 5 wherein said tubular extension is provided with a guide-acting closure for the outer end thereof.

7. A device for the second fermentation of fermentable liquids such as champagne, sparkling wines and other fermented beverages, which comprises a number of closed cylindrical containers each provided with at least one lateral projection and with a tubular extension downwardly projecting from one end of the container and adapted to receive sediments produced during fermentation; and a movable support for said containers, which comprises semi-cylindrical seats for supporting said containers in horizontal position for rocking movement about their longitudinal axes, each seat comprising anti-friction elements interposed between the seat and the container, and one or more stopping surfaces cooperating with said lateral projection or projections for limiting said rocking movement of the containers in said seats.

8. A device according to claim 7, wherein said tubular extension is provided with a quick-acting closure for the outer end thereof.

9. A device for the second fermentation of fermentable liquids such as champagne, sparkling wines and other fermented beverages, which comprises a number of closed cylindrical containers each provided with at least one lateral projection and with a tubular extension downwardly projecting from one end of said container and adapted to receive sediments produced during fermentation, said extension housing a piston adapted to be reciprocated between a position within the container and outside the tubular extension and a position within said tubular extension, means being provided for reciprocating said piston between said positions; and a movable support for said containers, which comprises semi-cylindrical seats for supporting said containers in horizontal position for rocking movement about their longitudinal axes, each seat comprising anti-friction elements interposed between the seat and the container, and one or more stopping surfaces cooperating with said lateral projection or projections for limiting said rocking movement of the containers in said seats.

10. A device for the second fermentation of fermentable liquids such as champagne, sparkling wines and other fermented beverages, which comprises a plurality of closed containers each provided with a curved bottom surface, means for rocking the container on its longitudinal axis, at least one tubular extension downwardly extending from said surface and housing a piston adapted to be moved from a position within the container and outside said extension to a position within said extension, and vice-versa, means for moving the piston, and at least one conduit for fluid leading from the outside of each container to its interior and a valve on each such conduit to enable controlled amounts of gases and liquid to flow into and from the container; and a movable support for said containers, which comprises curved seats on which said curved container surfaces rest, anti-friction means for allowing the containers to be rocked within said seats, and stop surfaces cooperating with said tubular extensions to limit the rocking movement of said containers in either direction.

11. In the process of producing champagne, sparkling wines and other fermented beverages, the combination of steps which comprises subjecting the liquid from which the beverage is prepared to fermentation within a plurality of containers, each of which is supported for rocking movement about its longitudinal axis by a movable support, periodically rocking each of said containers about its longitudinal axis, and periodically moving the fermenting liquids while in said containers carried on the support from a relatively hot zone to a relatively cold zone and vice versa and thereby subjecting the fermenting liquid in the containers to sudden changes of temperature and thus ageing the product.

12. A process according to claim 11, wherein said support is moved, after conclusion of the fermentation, to a chamber cooled down to a temperature of several degrees below 0° C., so as to precipitate the tartrates in the liquid and facilitate clarification thereof.

ANDRES BRUYERE.
JUAN ANDRES ROBERTO BRUYÈRE.

REFERENCES CITED

The following references are of record in the file of this patent:

"Industrial and Engineering Chemistry," vol. 27, No. 11, Nov. 1935, pages 1241 and 1242.

"Wines and Liquors" by K. M. Herstein & T. C. Gregory, published New York by D. Van Nostrand Co. Inc., 1935, pages 183 and 185.